(12) United States Patent
Den Besten et al.

(10) Patent No.: US 9,688,045 B2
(45) Date of Patent: Jun. 27, 2017

(54) LINER FOR REINFORCING A PIPE AND METHOD OF MAKING THE SAME

(71) Applicant: OCV Intellectual Capital, LLC, Toledo, OH (US)

(72) Inventors: Corneilis Den Besten, Elburg (NL); Jerome Francois, Aix les Bains (FR)

(73) Assignee: OCV Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/431,784

(22) PCT Filed: Oct. 14, 2013

(86) PCT No.: PCT/US2013/064772
§ 371 (c)(1),
(2) Date: Mar. 27, 2015

(87) PCT Pub. No.: WO2014/062539
PCT Pub. Date: Apr. 24, 2014

(65) Prior Publication Data
US 2015/0246501 A1  Sep. 3, 2015

Related U.S. Application Data

(60) Provisional application No. 61/714,514, filed on Oct. 16, 2012.

(51) Int. Cl.
*F16L 55/10* (2006.01)
*B32B 1/08* (2006.01)
(Continued)

(52) U.S. Cl.
CPC .................. *B32B 1/08* (2013.01); *B32B 5/06* (2013.01); *B32B 5/12* (2013.01); *B32B 5/26* (2013.01);
(Continued)

(58) Field of Classification Search
USPC .................. 138/97, 98; 405/150.1, 184.2
See application file for complete search history.

(56) References Cited

U.S. PATENT DOCUMENTS 3,684,645 A * 8/1972 Temple ................. B29C 70/081
156/166
3,730,808 A * 5/1973 Fekete .................... B29C 70/08
156/332

(Continued)

FOREIGN PATENT DOCUMENTS

| GB | 2113608 | 8/1983 |
|---|---|---|
| WO | 0218834 | 3/2002 |
| WO | 03038331 | 5/2003 |

OTHER PUBLICATIONS

International Search Report and Written Opinion from PCT/US13/64772 dated Jan. 16, 2014.
(Continued)

*Primary Examiner* — James Hook
(74) *Attorney, Agent, or Firm* — Calfee, Halter & Griswold LLP

(57) ABSTRACT

A reinforced liner and methods of manufacturing the liner are disclosed. The liner includes a glass veil layer as an innermost layer in combination with an outer reinforcing layer that includes glass fibers. The glass veil layer and the reinforcing layer are joined together, such as by an elastic yarn. Inclusion of the glass veil layer imparts desirable surface finish characteristics to the reinforced liner.

7 Claims, 3 Drawing Sheets

(51) Int. Cl.
  *B32B 5/26* (2006.01)
  *F16L 55/165* (2006.01)
  *B32B 5/06* (2006.01)
  *B32B 5/12* (2006.01)

(52) U.S. Cl.
  CPC ..... *F16L 55/1656* (2013.01); *B32B 2260/021* (2013.01); *B32B 2260/023* (2013.01); *B32B 2260/046* (2013.01); *B32B 2262/101* (2013.01); *B32B 2305/08* (2013.01); *B32B 2305/22* (2013.01); *B32B 2597/00* (2013.01); *Y10T 428/24124* (2015.01); *Y10T 428/249934* (2015.04); *Y10T 428/27* (2015.01)

(56) References Cited

U.S. PATENT DOCUMENTS

| | | | |
|---|---|---|---|
| 3,996,967 A | 12/1976 | Takada | |
| 4,009,063 A | 2/1977 | Wood | |
| 4,044,188 A * | 8/1977 | Segal | B29C 70/025 156/244.25 |
| 4,165,765 A * | 8/1979 | Gilbu | B29C 41/085 138/137 |
| 4,243,075 A * | 1/1981 | McPherson | F16L 9/14 138/124 |
| 4,369,224 A * | 1/1983 | Cordts | B29C 35/10 428/301.4 |
| 5,334,429 A * | 8/1994 | Imoto | B29C 63/34 138/128 |
| 5,535,786 A | 7/1996 | Makela et al. | |
| 5,798,013 A | 8/1998 | Brandenburger | |
| 5,868,169 A | 2/1999 | Catallo | |
| 5,931,199 A | 8/1999 | Kittson et al. | |
| 6,196,271 B1 * | 3/2001 | Braun | F16L 55/1654 138/97 |
| 6,360,780 B1 | 3/2002 | Adolphs et al. | |
| 6,615,875 B2 | 9/2003 | Adolphs et al. | |
| 2003/0234057 A1 * | 12/2003 | Woolstencroft | F16L 55/1656 138/125 |
| 2005/0161100 A1 * | 7/2005 | Pleydon | B29D 23/001 138/98 |
| 2008/0277012 A1 * | 11/2008 | Anders | F16L 55/1651 138/98 |
| 2010/0233417 A1 * | 9/2010 | Brewin | D04B 21/16 428/86 |
| 2010/0243091 A1 * | 9/2010 | D'Hulster | F16L 55/1651 138/97 |
| 2013/0291987 A1 * | 11/2013 | Brandenburger | F16L 55/1656 138/97 |

OTHER PUBLICATIONS

Jamestown Distributors, one page printout accessed on Sep. 11, 2012, Fiberglass Mat.
Communication pursuant to Rules 161(1) and 162 EPC from EP Application No. 13785698.5 dated Jun. 23, 2015.
Chinese Office Action from CN Application No. 201380059984.4 dated May 23, 2016.
Chinese Office Action from CN Application No. 201380059984.4 dated Jan. 23, 2017.
Office Action from JP Application No. 2015-537756 dated Feb. 27, 2017.

* cited by examiner

LINER FOR REINFORCING A PIPE AND METHOD OF MAKING THE SAME

RELATED APPLICATIONS

The present application is the U.S. national phase entry of PCT/US2013/064772, filed on Oct. 14, 2013, which claims priority to U.S. provisional application No. 61/714,514, filed on Oct. 16, 2012, both of which are hereby incorporated by reference in their entirety.

FIELD

The general inventive concepts relate to liners for rehabilitating an underground piping system, and in particular, to reinforced liners having improved properties for such rehabilitations. The general inventive concepts also relate to methods of manufacturing such liners. The liners are useful in the repair and rehabilitation of piping systems that are damaged and/or deteriorated.

BACKGROUND

Underground piping systems are essential for transporting liquids and gases to homes and businesses. Utilities typically use these piping systems for sewer, water, gas, and other applications. Such piping systems are installed several feet underground and access to the piping systems is therefore limited.

Underground pipes experience cyclical loadings, premature wear, corrosion, porosity, and ambient foundation or earth movements. These factors contribute to the overall deterioration of the pipes. Often the pipes develop damaged or weakened areas requiring repair.

To maintain the service afforded by the underground piping system, any cracks or leaks must be promptly detected and repaired. Such repair generally requires the replacement of a long length of the pipe, since the repair of a small section of the pipe by welding, patching or otherwise, is usually unsatisfactory and difficult or even impossible because the pipe diameter does not allow human access in safe conditions. In the case of an underground pipe, the replacement of the pipe is difficult, expensive, and time consuming.

A solution for the repair of underground pipes is to repair a pipe while it is still in place. In-situ pipe repair procedures have been developed. Some procedures include the insertion of a pliable reinforcement liner into the damaged pipe. The liner typically has an outer diameter which is substantially the same as the inner diameter of the damaged pipe. The liner is pressurized so that it presses firmly along the inner wall of the damaged pipe. The expanded liner is then cured to form a new, rigid lining or surface within the original pipe.

There are several types of reinforcement or reinforcing liners. Some liners are made from a polyester material. Other liners utilize fibers that are impregnated with a synthetic resin. Fibrous mats are alternatively used as the material for a liner. Some reinforcement liners include glass fibers for support and strength, since glass fibers have a high strength and stiffness, while still possessing good resistance to elongation.

Some liners are hardened or cured after they have been installed. These liners are referred to as "cured-in-place pipe (CIPP)" liners. The resin in a cured-in-place liner bonds or adheres to the glass or other reinforcement fibers after it is cured. Due to the bond between the resin and the fibers, the resin also becomes more resistant to stretching when axial or radial loads are applied to the cured liner. Thus, the cured resin is reinforced by fibers so long as the bond between the resin and glass fibers is not broken.

The liners are typically installed in environments that are continuously exposed to water and other corrosive materials. In particular, due to the presence of anaerobic bacteria in sewage water, sewer pipelines often contain hydrogen sulfide, the oxidation of which develops diluted sulfuric acid in the sewage water. The liners are also exposed to varying temperatures and flow conditions. Thus, the liners should be designed to withstand such environments.

The liner inserted inside a pipe should also have good flexibility to stretch and adjust itself to the host pipe diameter before cure, and must have good strength characteristics and adequate stiffness after cure to resist ground settlement or ground movement particularly if the host pipe has lost its required structural integrity.

Production methodologies for producing CIPP glass liners include a folding process and a winding process.

As shown in FIG. 1, in a conventional folding process 100, multiple layers of fabric 102 (e.g., woven roving mat fabrics) are folded together with an overlap of several centimeters per layer around a inner tubular film 104 (e.g., a styrene tight tubular film). The total glass pack is then wrapped in an outer film 106 (e.g., a joint welded outer film). The number of fabric layers 102 depends on the required wall thickness. After preparing the dry tube, impregnation with a resin is performed. This impregnation step is often assisted by vacuum. The impregnated liner is then shielded from daylight/UV light to prevent premature curing of the resin.

To install the liner (formed by the folding process 100) within a pipe (e.g., a sewer pipe), the liner is pulled into the pipe and inflated using air pressure. The air pressure within the liner acts to push the liner against the inner surface of the pipe being rehabilitated. The different impregnated fabric layers 102 slide over each other enabling the liner to expand matching the shape of the original pipe, resulting in a very close fit. Finally, the liner is cured, such as by ultraviolet (UV) light delivered by a series of UV lamps traveling through the pressurized liner.

In a conventional winding process 200, fabric rolls of a limited width are first impregnated with a resin/thickening agent mixture and rewound for maturation. After a defined maturation period, the pre-impregnated rolls are unwound and the associated fabrics 202 spirally wounded on a mandrel 204 covered in a plastic foil 206, as shown in FIG. 2. This winding operation continues until the required laminate thickness is achieved. The pre-impregnated fabrics are then covered by a thermoplastic outer film and protected against daylight/UV light during storage and transport.

To install the liner (formed by the winding process 200) within a pipe (e.g., a sewer pipe), the liner is pulled into the pipe and inflated using air pressure. The air pressure within the liner acts to push the liner against the inner surface of the pipe being rehabilitated. Expansion of the liner is mainly achieved by stretching of the fabrics 202. Finally, the liner is cured, such as by UV light delivered by a series of UV lamps traveling through the pressurized liner.

SUMMARY

The general inventive concepts contemplate systems, apparatuses, and methods relating to the rehabilitation of underground pipes and, more specifically, to systems and methods for producing reinforced CIPP liners having improved inner surface characteristics, as well as the liners themselves which provide the improved inner surface characteristics.

In one exemplary embodiment, a reinforced liner for rehabilitating a pipe is disclosed. The reinforced liner comprises: a veil layer formed from randomly oriented chopped glass fibers; a reinforcing layer including glass fibers; and a resin, wherein said veil layer is closer to a central axis of the reinforced liner than said reinforcing layer, wherein said veil layer and said reinforcing layer are interfaced with one another, wherein said resin impregnates said reinforcing layer, and wherein said resin is curable by application of energy. In one exemplary embodiment, said energy is ultraviolet (UV) radiation. In one exemplary embodiment, said veil layer is translucent to UV light.

In one exemplary embodiment, said veil layer has a glass content in the range of 10-200 $g/m^2$. In one exemplary embodiment, said veil layer has a glass content of approximately 30 $g/m^2$.

In one exemplary embodiment, said glass fibers of said reinforcing layer are randomly oriented chopped glass fibers. In one exemplary embodiment, said reinforcing layer has a glass content in the range of 400-700 $g/m^2$.

In one exemplary embodiment, said glass fibers of said reinforcing layer are uniformly oriented continuous glass fibers. In one exemplary embodiment, said reinforcing layer has a glass content in the range of 50-200 $g/m^2$. In one exemplary embodiment, said reinforcing layer has a glass content of approximately 140 $g/m^2$.

In one exemplary embodiment, said glass fibers of said reinforcing layer are uniformly oriented parallel to the central axis of the reinforced liner. In one exemplary embodiment, said glass fibers of said reinforcing layer are oriented perpendicular to the central axis of the reinforced liner.

In one exemplary embodiment, the reinforced liner further comprises: a first reinforcing layer including first glass fibers, and a second reinforcing layer including second glass fibers, wherein said second glass fibers are oriented at an angle with respect to said first glass fibers, and wherein said second glass fibers include chopped glass fibers in substantially parallel alignment.

In one exemplary embodiment, said first glass fibers are aligned in substantially the same direction. In one exemplary embodiment, said first glass fibers are discontinuous fibers. In one exemplary embodiment, said second glass fibers are substantially perpendicular to said first glass fibers.

In one exemplary embodiment, the reinforced liner further comprises a filler material positioned between said first reinforcing layer and said second reinforcing layer. In one exemplary embodiment, said filler material includes one of a resin, a glass, a shredded recycled glass reinforced plastic compound, and a plurality of microspheres.

In one exemplary embodiment, said veil layer and said at least one reinforcing layer are sewn together by a stitching element. In one exemplary embodiment, said stitching element is an elastic yarn.

In one exemplary embodiment, said reinforced liner has a longitudinal axis, said second glass fibers are substantially oriented in the direction of said longitudinal axis, and said first glass fibers are disposed substantially perpendicular to said second glass fibers.

In one exemplary embodiment, an inner surface of the reinforced liner after curing is sufficiently smooth as to pass a high pressure water cleaning test.

In one exemplary embodiment, an inner surface of the reinforced liner after curing forms a protective layer covering said first glass fibers bonded with said resin and said second glass fibers bonded with said resin. In one exemplary embodiment, said protective layer can wear away during use without degrading performance of the reinforced liner.

In one exemplary embodiment, a method of manufacturing a reinforced liner for rehabilitating a pipe is disclosed. The method comprises: providing a veil layer formed from randomly oriented chopped glass fibers; providing a reinforcing layer including glass fibers; joining said veil layer and said reinforcing layer; impregnating the joined veil layer and reinforcing layer with a resin; and forming a tube from the joined veil layer and reinforcing layer such that said veil layer is closer to a central axis of said tube than said reinforcing layer. In one exemplary embodiment, said resin is curable by application of UV radiation. In one exemplary embodiment, said veil layer is translucent to ultraviolet (UV) light.

In one exemplary embodiment, said veil layer has a glass content in the range of 10-200 $g/m^2$. In one exemplary embodiment, said veil layer has a glass content of approximately 30 $g/m^2$.

In one exemplary embodiment, said glass fibers of said reinforcing layer are randomly oriented chopped glass fibers. In one exemplary embodiment, said reinforcing layer has a glass content in the range of 400-700 $g/m^2$.

In one exemplary embodiment, said glass fibers of said reinforcing layer are uniformly oriented continuous glass fibers. In one exemplary embodiment, said reinforcing layer has a glass content in the range of 50-200 $g/m^2$. In one exemplary embodiment, said reinforcing layer has a glass content of approximately 140 $g/m^2$.

In one exemplary embodiment, said glass fibers of said reinforcing layer are uniformly oriented parallel to the central axis of said tube. In one exemplary embodiment, said glass fibers of said reinforcing layer are oriented perpendicular to the central axis of said tube.

In one exemplary embodiment, said reinforcing layer comprises a first reinforcing layer including first glass fibers, and a second reinforcing layer including second glass fibers, wherein said second glass fibers are oriented at an angle with respect to said first glass fibers, and wherein said second glass fibers include chopped glass fibers in substantially parallel alignment. In one exemplary embodiment, said first glass fibers are aligned in substantially the same direction. In one exemplary embodiment, said first glass fibers are discontinuous fibers. In one exemplary embodiment, said second glass fibers are substantially perpendicular to said first glass fibers.

In one exemplary embodiment, the method further comprises providing a filler material between said first reinforcing layer and said second reinforcing layer. In one exemplary embodiment, said filler material includes one of a resin, a glass, a shredded recycled glass reinforced plastic compound, and a plurality of microspheres.

In one exemplary embodiment, said veil layer and said reinforcing layer are sewn together by a stitching element. In one exemplary embodiment, said stitching element is an elastic yarn.

In one exemplary embodiment, said reinforced liner has a longitudinal axis, said second glass fibers are substantially oriented in the direction of said longitudinal axis, and said first glass fibers are disposed substantially perpendicular to said second glass fibers.

In one exemplary embodiment, an inner surface of the reinforced liner after curing is sufficiently smooth as to pass a high pressure water cleaning test.

In one exemplary embodiment, an inner surface of the reinforced liner after curing forms a protective layer covering said first glass fibers bonded with said resin and said second glass fibers bonded with said resin. In one exemplary embodiment, said protective layer can wear away during use without degrading performance of the reinforced liner.

Other aspects, advantages, and features of the general inventive concepts will become apparent to those skilled in the art from the following detailed description, when read in light of the accompanying drawings.

BRIEF DESCRIPTION OF THE DRAWINGS

For a fuller understanding of the nature and advantages of the general inventive concepts, reference should be had to the following detailed description taken in connection with the accompanying drawings, in which.

DETAILED DESCRIPTION

Figure 1:
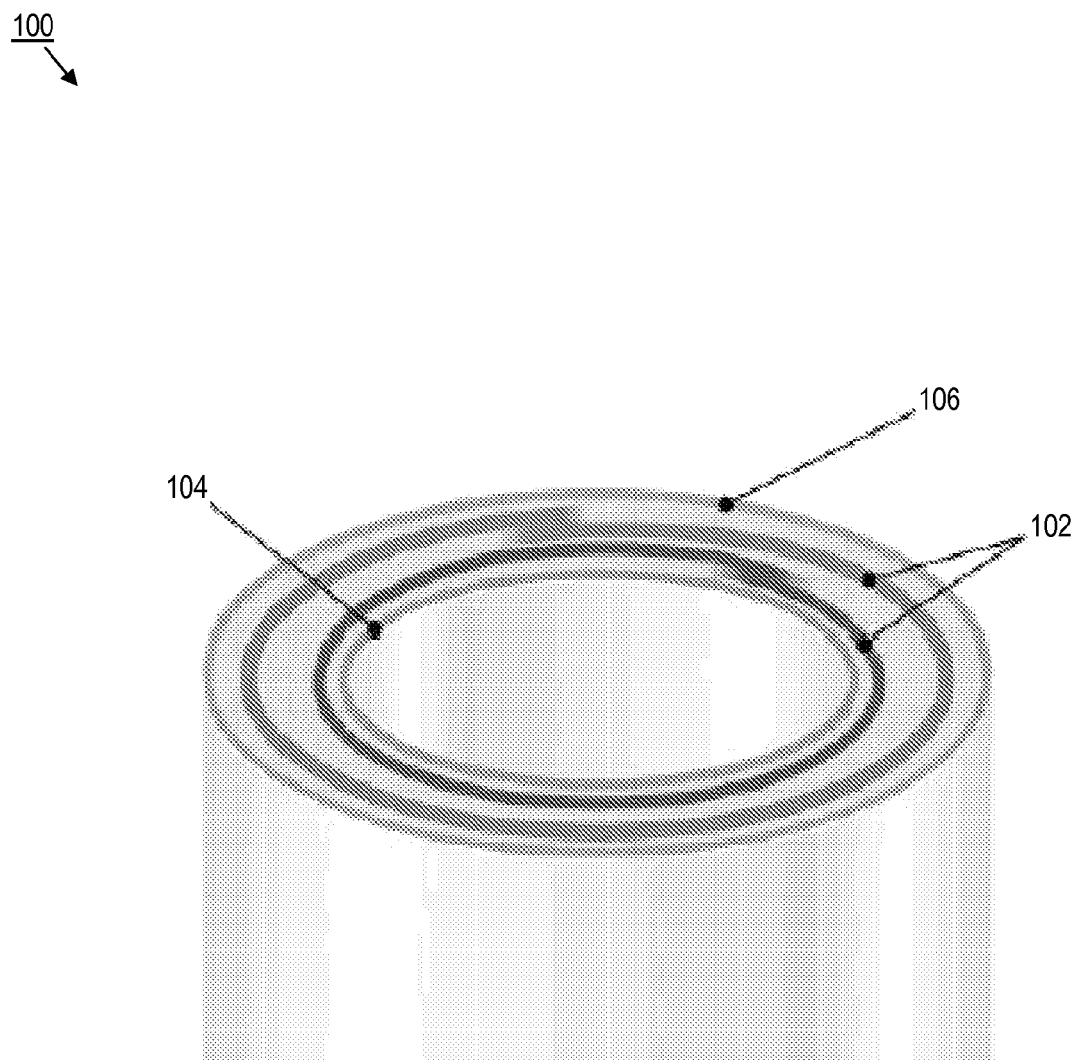
FIG. 1 is a cross-sectional, perspective view of a conventional CIPP liner formed by a folding process.

While the general inventive concepts are susceptible of embodiment in many different forms, there are shown in the drawings and will be described herein in detail specific embodiments thereof with the understanding that the present disclosure is to be considered as an exemplification of the principles of the general inventive concepts. Accordingly, the general inventive concepts are not intended to be limited to the specific embodiments illustrated herein.

Unless otherwise defined, the terms used herein have the same meaning as commonly understood by one of ordinary skill in the art encompassing the general inventive concepts. The terminology used herein is for describing exemplary embodiments of the general inventive concepts only and is not intended to be limiting of the general inventive concepts. As used in the description of the general inventive concepts and the appended claims, the singular forms "a," "an," and "the" are intended to include the plural forms as well, unless the context clearly indicates otherwise.

Figure 3:
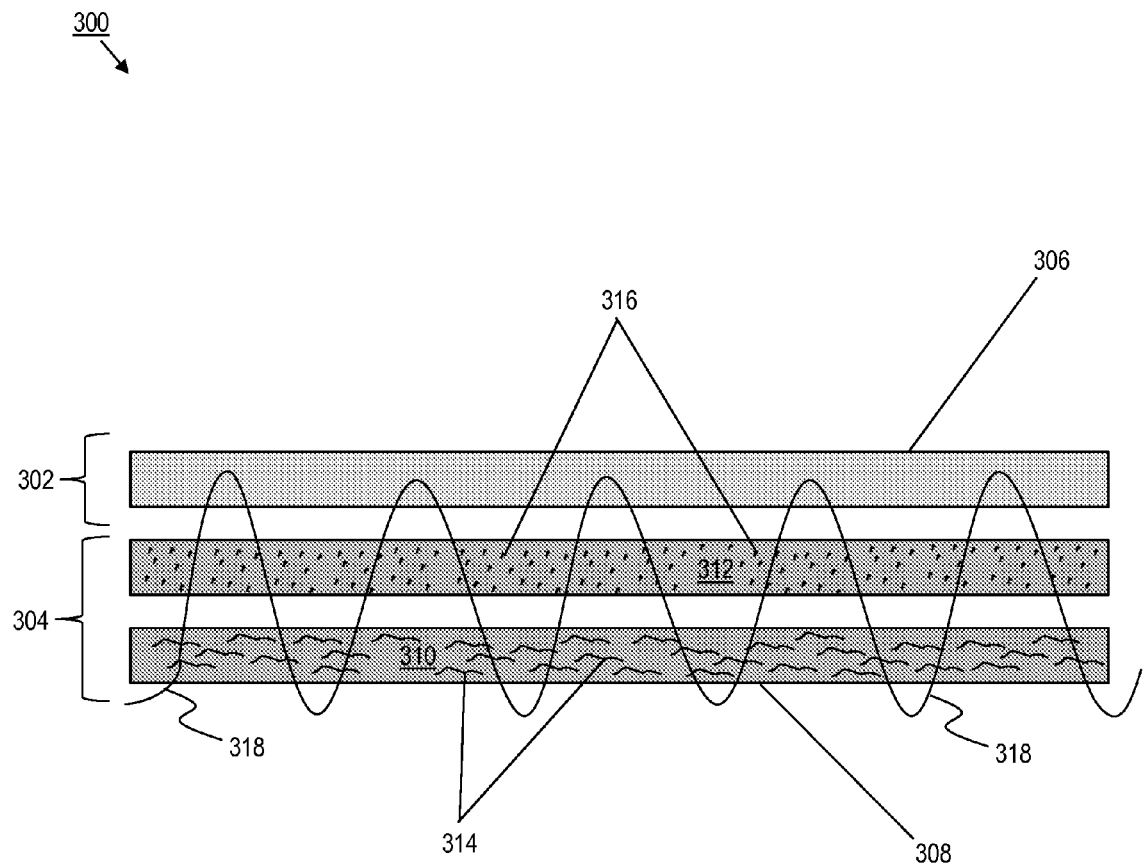
FIG. 3 is a cross-sectional side view of the layers of a reinforced CIPP liner, according to one exemplary embodiment.

A reinforced liner 300 providing improved inner surface properties, according to one exemplary embodiment, is shown in FIG. 3.

Such reinforced liners typically include a series of reinforcing members that are oriented in the peripheral direction which is perpendicular to the longitudinal axis of the liner. These reinforcing members are disposed about the circumference of the liner and provide radial strength and stiffness to the liner after the liner has been cured and solidified. The reinforcing members are typically filamentary elements, such as glass fibers.

The reinforced liner may also provide support in its longitudinal direction. In particular, the liner can include reinforcing members oriented along its longitudinal axis. These reinforcing members are typically filamentary elements, such as glass fibers.

The reinforced liner should be flexible in the radial direction before curing and should provide sufficient stiffness after cure. Flexibility in the radial direction allows the reinforced liner to expand radially to press against the inner wall of the damaged pipe. Different pipes (and the damaged regions thereof) may have different cross-sectional shapes and contours. Accordingly, the reinforced liner may not have continuous inner and outer diameters along its length when the liner is positioned and cured.

Glass fibers have a relatively low elongation property. Accordingly, a reinforced liner with continuous glass fibers oriented in the radial direction of the liner has a limited capability to extend in the radial direction. Thus, the general inventive concepts include the manufacture of a reinforcement fabric that is stretchable in the warp, weft, or both directions. The fabric, after transformation into a hose shape, is easy to insert into a host pipe and easy to inflate to conform to the diameter of a damaged pipe.

An exemplary liner embodying these principles, with the reinforced liner 300 being one such example, includes one or more reinforcing fabric layers. In one exemplary embodiment, the fabric layers includes a fabric with continuous fibers oriented along the length of the liner and discontinuous fibers oriented substantially perpendicular to the length of the liner. The different fibers are coupled together to form the fabric. The discontinuous fibers provide flexibility and hoop strength in the radial or peripheral direction of the liner. The liner is formed by overlapping strips of fabric. For example, the strips may be helically wound, circumferentially wound, or placed as longitudinal strips.

A great variety of these reinforcement fabrics are encompassed by the general inventive concepts. Some exemplary embodiments of such fabrics are illustrated in U.S. Pat. No. 6,360,780 (the '780 patent) and U.S. Pat. No. 6,615,875 (the '875 patent), both of which are commonly owned by the Applicant. The disclosure of the '780 patent is hereby incorporated by reference in its entirety. The disclosure of the '875 patent is hereby incorporated by reference in its entirety. One of ordinary skill in the art will appreciate that the general inventive concepts encompass other reinforcement fabric configurations and arrangements as well.

In accordance with the general inventive concepts, the reinforced liner 300 includes a veil layer 302 or layers, in addition to one or more reinforcing fabric layers 304. The veil layer 302 is made of glass. Any suitable glass can be used for the veil layer 302. In one exemplary embodiment, the veil layer 302 is formed of Advantex® glass, a product of Owens Corning Corporation. In one exemplary embodiment, the glass content of the veil layer is in the range of 10-200 g/m², inclusive. In one exemplary embodiment, the glass content of the veil layer is in the range of 10-100 g/m², inclusive. In one exemplary embodiment, a glass content of the veil layer 302 is approximately 30 g/m². In one exemplary embodiment, each veil layer 302 is formed from a multitude of randomly oriented chopped glass fibers that are bound to one another via application of a binder.

The veil layer 302 is situated as the innermost glass layer of the reinforced liner 300 and imparts many beneficial properties to the reinforced liner 300. For example, the combination of the veil layer 302 and the fabric layers 304 provides the reinforced liner 300 with good impregnation properties, such as good resin pick-up and roll formation (e.g., winding stability). Thus, the reinforced liner 300 can easily take in a required amount of resin and retain it, without the resin being pressed out. As a result, it may be possible to increase the impregnation speed of the liner 300. Further, if the liner 300 is impregnated with resin during a winding process, the veil layer 302 can improve the stability of the resulting roll, for example, by taking up tension during the winding. Consequently, this winding stability (for a given resin content) is evidenced by relatively uniform winding of the liner 300 without wrinkles.

The veil layer 302 can also contribute to high UV translucency which allows for faster and/or more efficient curing of the reinforced liner 300.

Because the veil layer 302 will typically be situated as the innermost layer 306 (as opposed to the outermost layer 308) of the reinforced liner 300, it can also impart improved surface finish properties (e.g., smoothness) to the liner 300 once cured. As a result, the smoother inner surface of the cured liner 300 may allow it to more readily pass testing that is often used in the industry, such as a high pressure water cleaning test. Without a veil layer, an inner surface of a cured liner may be rough and/or porous, which may make it more difficult to pass such testing.

Another surface finish property provided by the veil layer 302 is the formation of a protective layer that could disappear (e.g., by wear) during service without impacting the structural performance of the lined pipe. The protective layer resulting from use of the veil layer 302 is more resistant to abrasion than a construction without the veil layer 302, such that the cured liner 300 should experience a lower rate of abrasion (weight loss). Thus, the protective layer is a sacrificial layer that can provide increased abrasion and wear resistance, thereby further protecting the underlying reinforcing fabric layers 304.

As noted above, the general inventive concepts contemplate CIPP liners having at least one fabric layer 304 as a reinforcing layer. Each fabric layer 304 is situated further from a central axis of the liner 300 than the veil layer 302. In one exemplary embodiment, at least one fabric layer 304 is closer to the outermost layer 308 of the reinforced liner 300 than the innermost layer 306 of the reinforced liner 300. Typically, one of the fabric layers 304 (e.g., the first reinforcing layer 310) will be the outermost layer 308 of the reinforced liner 300. The CIPP liners encompassed by the general inventive concepts can include other layers as well, such as non-reinforcing fabric layers.

In one exemplary embodiment, each of the fabric layers 304 is formed as a continuous strip of material. As shown in FIG. 3, the fabric layers 304 of the reinforced liner 300 include a first reinforcing layer 310 and a second reinforcing layer 312. In one exemplary embodiment, at least one of the fabric layers 304 contains glass fibers that are randomly distributed throughout the layer. In one exemplary embodiment, at least one of the fabric layers 304 is formed from chopped glass fibers that are randomly oriented within the layer, the glass content of the layer being in the range of 450-600 g/m$^2$, inclusive. In one exemplary embodiment, the glass content of the layer is in the range of 400-600 g/m$^2$, inclusive.

In one exemplary embodiment, at least one of the fabric layers 304 contains glass fibers that are relatively uniformly oriented within the layer. In one exemplary embodiment, the reinforcing layers 310 and 312 include glass fibers having different orientations than one another, such as disclosed in the '780 patent and/or the '875 patent. In one exemplary embodiment, at least one of the reinforcing layers 310 and 312 has a glass content in the range of 50-200 g/m$^2$, inclusive. In one exemplary embodiment, at least one of the reinforcing layers 310 and 312 has a glass content of approximately 140 g/m2.

The thickness of each reinforcing layer 310, 312 may be varied to enhance the strength and stiffness properties of the liner 300. The thickness of the layers 310, 312 is determined by the glass types, quantities, tex, etc. Similarly, several fabric layers 304, either identical or different from one another, can be on top of each other to obtain the final liner thickness and desired liner construction.

In one exemplary embodiment, the first reinforcing layer 310 includes filamentary elements or fibers 314 (e.g., glass fibers) that extend in substantially the same direction. In particular, the fibers 314 extend in the longitudinal direction of the reinforced liner 300. Accordingly, the fibers 314 provide strength to the liner 300 in that direction. In one exemplary embodiment, the second reinforcing layer 312 includes filamentary elements or fibers 316 (e.g., glass fibers) that are disposed in substantially the same direction as each other. These fibers 316 extend in a direction substantially perpendicular to the fibers 314 in the first reinforcing layer 310. In one exemplary embodiment, the fibers 316 are long, chopped fibers and are distributed in substantially parallel lines. In the finished reinforced liner 300, these fibers 316 can extend in the circumferential or peripheral direction of the liner 300. The orientations of the fibers 314 in the first reinforcing layer 310 and the fibers 316 in the second reinforcing layer 312 generate a cross-hatching pattern that provides support to the reinforced liner 300 in the radial and circumferential directions.

In one exemplary embodiment, fibers 314 and/or 316 are glass fibers, such as E or ECR-type glass fibers. In one exemplary embodiment, the fibers 314 and/or 316 may include S-2 type of glass fibers, pulp fiber, cotton, polyethylene, polypropylene, polyester, aramide and carbon fibers.

In one exemplary embodiment, the veil layer of the reinforced liner 300 has a glass content of approximately 30 g/m$^2$, the first reinforcing layer 310 of the reinforced liner 300 has a glass content of approximately 140 g/m$^2$, and the second reinforcing layer 312 of the reinforced liner 300 has a glass content of approximately 450 g/m$^2$.

The reinforcing layers 310, 312 are joined, coupled, or otherwise interfaced with one another. In one exemplary embodiment, the reinforcing layers 310, 312 are sewn together (see FIG. 3) by stitching means 318. The stitching means 318 is stitched or woven through the layers 310, 312 to secure them together. The stitching means 318 is flexible to enhance the stretching and pliability of the fabric layers 304 and, thus, the reinforced liner 300. The stitching means may be made from an elastic or rubbery-type of material. In one exemplary embodiment, the stitching means 318 is an elastic yarn or the like. In one exemplary embodiment, the stitching means 318 is an unstretched polyester yarn or other material that can be stretched. Other suitable means for joining the reinforcing layers (such as via an adhesive) fall within the general inventive concepts.

The veil layer 302 is also joined, coupled, or otherwise interfaced with the reinforcing layers 310, 312. In one exemplary embodiment, the veil layer 302 is sewn together with the reinforcing layers 310, 312 (see FIG. 3) by the stitching means 318. The stitching means 318 is stitched or woven through the veil layer 302 and the reinforcing layers 310, 312 to secure them together. The stitching means 318 is flexible to enhance the stretching and pliability of the combined veil layer 302 and fabric layers 304 and, thus, the reinforced liner 300. The stitching means may be made from an elastic or rubbery-type of material. In one exemplary embodiment, the stitching means 318 is an elastic yarn or the like. In one exemplary embodiment, the stitching means 318 is an unstretched polyester yarn or other material that can be stretched. In one exemplary embodiment, a second stitching means that differs from the stitching means 318 is used to join the veil layer 302 to the fabric layers 304. Other suitable means for joining the veil layer 302 and the reinforcing layers 310, 312 (such as via an adhesive) fall within the general inventive concepts.

The reinforced liner 300 (e.g., the veil layer 302 and/or the fabric layers 304) also includes a resinous material or the like that is cured by the application of energy. In one exemplary embodiment, the resinous material is cured using UV radiation. The resinous material may be applied to the liner 300 in any suitable manner. In one exemplary embodiment, the resinous material is applied to the veil layer 302 and/or the fiber layers 304 before the layers are wound into a tube. In one exemplary embodiment, the resinous material is applied to the veil layer 302 and/or the fiber layers 304 while the layers are being wound into a tube during a winding process (e.g., the winding process 200). In one exemplary embodiment, the formed tube itself is impregnated all at once. The resinous material cures and bonds with the layers (e.g., with the fibers 314 and 316 in the fabric layers 304) to provide strength to the liner 300.

Any suitable resinous material may be used. In one exemplary embodiment, the resinous material is an unsaturated polyester resin, modified or not. In one exemplary embodiment, the resinous material is a vinylester resin. In one exemplary embodiment, the resinous material is a heat curable epoxy resin.

The reinforced liner 300 may include additional materials, such as a filler material. The filler material can be used to control a thickness of the liner 300 or portions thereof. Exemplary filler materials include resin; calcium carbonate; and glass beads or bubbles, which do not necessarily need to be melted. In one exemplary embodiment, the filler material includes expanded or unexpanded microspheres. The microspheres are small spherical polymer shells that encapsulate a gas. When the gas is heated, its pressure increases and the shell softens and expands. In one exemplary embodiment, the filler material includes a recycled mixture of glass and resin including recycled glass reinforced plastic compound such as shredded sheet material compound (SMC) parts.

For liners that are cured by UV radiation, the filler material is preferably as translucent as possible, e.g., bubbles, microspheres, or chopped glass fibers. In one exemplary embodiment, the filler material includes a prefabricated material, such as a fleece or felt material. The filler material may be interposed or otherwise situated between the reinforcing layers (e.g., the layers 310 and 312) which are sewn together as described above.

In general, each of the fabric layers 304 is formed as a flat continuous sheet and collected in the form of a roll. The orientations of the reinforcing layers 310 and 312 in the reinforced liner 300 are determined by the method by which the liner 300 is made. For example, the long, chopped fibers 316 may be oriented substantially in the peripheral direction of the finished liner 300. Accordingly, the orientation of the fibers 316 in the formation of the fabric layers 304 relates to the particular orientation of the corresponding fabric roll during the formation of the liner 300.

An exemplary roll used to form the reinforced liner 300 includes one or more continuous fabric layers 304. In one exemplary embodiment, the roll includes a continuous fabric including the first reinforcing layer 310 and the second reinforcing layer 312 which are stitched together via the stitching means 318. In one exemplary embodiment, the roll includes a continuous fabric including the veil layer 302 and the one or more fabric layers 304 which are stitched together via the stitching means 318.

Figure 2:
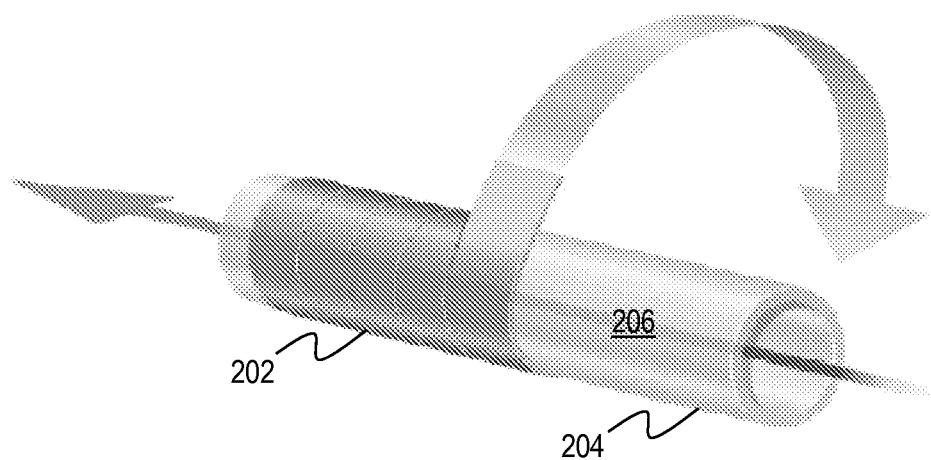
FIG. 2 is a perspective view of a conventional CIPP liner being formed by a winding process.

The general inventive concepts also contemplate methods of manufacturing a reinforcement liner, such as the reinforced liner 300. A method of manufacturing a reinforcement, according to one exemplary embodiment, includes supplying the veil layer 302 and the fabric layers 304 from one or more rolls onto a forming system. The forming system could implement a winding process, such as the conventional winding process 200 shown in FIG. 2. An example of a winding process explained in greater detail is disclosed in U.S. Pat. No. 5,798,013 (the '013 patent). The disclosure of the '013 patent is hereby incorporated by reference in its entirety.

The forming system includes a mandrel that is fixed in position. The mandrel has a longitudinal axis and an outer surface. A layer of film, such as a waterproof and resin proof thermoplastic film, is applied to the outer surface of the mandrel. In one exemplary embodiment, the veil layer 302 could be applied to the outer surface of the mandrel in addition to or in place of the thermoplastic film.

A roll (e.g., the roll of the veil layer 302 and the fabric layers 304) is rotated circumferentially about the mandrel. In this manner, the layers 302 and 304 are laid on the film on the mandrel in a helical pattern with successive layers overlapping a portion of the preceding layers and advanced in the direction of the longitudinal axis of the mandrel. The angle at which the fabric layers are wound on the mandrel may be adjusted to vary the thickness of the resulting liner.

A method of manufacturing a reinforcement, according to one exemplary embodiment, includes supplying the veil layer 302 and the fabric layers 304 from several rolls simultaneously onto a forming system. The forming system includes a supporting mandrel with a layer of film positioned on its outer surface. Several instances of the veil layer 302 and/or the fabric layers 304 are formed into a corresponding number of rolls. Each roll is mounted in a position about the circumference of the mandrel.

The rolls are coupled to a support device that enables the rolls to unwind and lay the material along the direction of the longitudinal axis of the mandrel. The rolls are positioned so that adjacent strips of fabric overlap each other. In one exemplary embodiment, the veil layer 302 and the fabric layers 304 could be applied to the outer surface of the mandrel in separate steps. In one exemplary embodiment, the veil layer 302 and the fabric layers 304 could be applied to the outer surface of the mandrel at the same time. In one exemplary embodiment, the veil layer 302 could be applied to the outer surface of the mandrel in addition to or in place of the layer of film.

One of ordinary skill in the art will appreciate that the reinforced liners encompassed by the general inventive concepts, such as the reinforced liner 300, may be installed in a damaged pipe by any suitable method, including conventional installation methods. Exemplary installation methods include "inversion" or "reversion" methods and "winch-in-place" (WIP) or "winch-through" methods.

Once installed the reinforced liners (e.g., the reinforced liner 300) is then cured or hardened by applying the appropriate type of energy to cure the energy setting resin. In one exemplary embodiment, the curing energy is UV radiation. Other exemplary types of energy that could be used to cure resin include ultrasound energy, and heat by radiation, convection, or conduction. In one exemplary embodiment, at least a portion of the curing is initiated by heat. In one exemplary embodiment, the liner is cured after it is fully installed. In one exemplary embodiment, the liner is cured as it is installed.

The general inventive concepts also contemplate methods of rehabilitating a piping system. A method of rehabilitating a piping system, according to one exemplary embodiment, will now be described with reference to a piping system installed underground. The piping system includes a pipe and several openings. The openings are sized to permit access to the pipe at periodic locations along the length of the piping system. The pipe includes a damaged region. The damaged region may include cracks or a weakened or thinned region. The pipe may sag in the weakened or thin region. A variety of forces could play a role in damaging the pipe, including ambient environmental conditions, wear or corrosive material in the piping system, and external loading, porosity, and growing roots. The pipe is repaired or rehabilitated to ensure the usefulness and function of the piping system.

According to the exemplary method of rehabilitating the piping system, a reinforced liner (e.g., the reinforced liner 300) is inserted in the damaged region of the pipe. Once cured, the reinforced liner 300 typically provides support in the radial direction to prevent any sagging of the pipe and to cover and seal any cracks in the pipe.

The above description of specific embodiments has been given by way of example. From the disclosure given, those skilled in the art will not only understand the general inventive concepts and their attendant advantages, but will also find apparent various changes and modifications to the structures and concepts disclosed. For example, the general inventive concepts encompass reinforced liners having layers with glass contents that differ from those expressly disclosed herein. It is sought, therefore, to cover all such changes and modifications as fall within the spirit and scope of the general inventive concepts, as defined herein and by the appended claims, and equivalents thereof.

What is claimed is:

1. A reinforced liner for rehabilitating a pipe, the reinforced liner comprising:
   a veil layer formed from randomly oriented chopped glass fibers;
   a first reinforcing layer including first glass fibers, said first glass fibers being chopped glass fibers in substantially parallel alignment;
   a second reinforcing layer including second glass fibers, said second glass fibers being chopped glass fibers in substantially parallel alignment; and
   a resin,
   wherein said second glass fibers are oriented at an angle with respect to said first glass fibers,
   wherein said veil layer is closer to a central axis of the reinforced liner than said reinforcing layers,
   wherein said veil layer and said reinforcing layers are interfaced with one another,
   wherein said resin impregnates said reinforcing layers, and
   wherein said resin is curable by application of energy.

2. The reinforced liner of claim 1, wherein said veil layer has a glass content in the range of 10-200 g/m$^2$.

3. The reinforced liner of claim 2, wherein said veil layer has a glass content of approximately 30 g/m2.

4. The reinforced liner of claim 1, wherein said reinforcing layers have a combined glass content in the range of 400-700 g/m2.

5. The reinforced liner of claim 1, wherein said veil layer is translucent to ultraviolet light.

6. The reinforced liner of claim 1, wherein an inner surface of the reinforced liner after curing is sufficiently smooth as to pass a high pressure water cleaning test.

7. The reinforced liner of claim 1, wherein said energy is ultraviolet radiation.

* * * * *